US 8,341,453 B2

(12) United States Patent
Shiraishi et al.

(10) Patent No.: US 8,341,453 B2
(45) Date of Patent: Dec. 25, 2012

(54) TRANSMISSION APPARATUS THAT TRANSMITS DATA ACCORDING TO A PROTOCOL, AND METHOD FOR MEASURING TIME IN THE TRANSMISSION APPARATUS

(75) Inventors: Daisuke Shiraishi, Tokyo (JP); Kazuhiko Morimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 12/209,700

(22) Filed: Sep. 12, 2008

(65) Prior Publication Data

US 2009/0083570 A1    Mar. 26, 2009

(30) Foreign Application Priority Data

Sep. 25, 2007   (JP) ................. 2007-248185

(51) Int. Cl.
  *G06F 1/04*  (2006.01)
  *G06F 1/14*  (2006.01)
(52) U.S. Cl. ........................ 713/600; 713/502
(58) Field of Classification Search .................. 713/300, 713/500, 501, 502, 503; 714/748, 749
  See application file for complete search history.

(56) References Cited

U.S. PATENT DOCUMENTS

| 6,125,404 | A  | * | 9/2000  | Vaglica et al. ............... 713/375 |
| 6,363,425 | B1 | * | 3/2002  | Hook et al. .................. 709/226 |
| 6,560,662 | B1 | * | 5/2003  | Sakai ........................... 710/104 |
| 7,082,486 | B2 |   | 7/2006  | DeWitt, Jr. et al. ........... 710/260 |
| 7,855,975 | B2 | * | 12/2010 | Neugebauer .................. 370/252 |
| 8,000,256 | B2 | * | 8/2011  | Cha et al. ..................... 370/252 |
| 2001/0021661 | A1 | * | 9/2001  | Pautonnier .................... 455/561 |
| 2003/0012212 | A1 | * | 1/2003  | Earnshaw et al. ............ 370/428 |
| 2003/0194991 | A1 | * | 10/2003 | Gilmour ...................... 455/414.1 |
| 2006/0164990 | A1 | * | 7/2006  | Bhushan et al. .............. 370/235 |
| 2009/0300402 | A1 | * | 12/2009 | Patel ............................. 713/502 |

FOREIGN PATENT DOCUMENTS

| JP | 59-17757 A  | 1/1984 |
| JP | 63-074351 A | 4/1988 |
| JP | 03-273350 A | 12/1991 |
| JP | 07-123128 A | 5/1995 |

* cited by examiner

*Primary Examiner* — Dennis M Butler

(74) *Attorney, Agent, or Firm* — Fitzpatrick, Cella, Harper & Scinto

(57) ABSTRACT

A transmission apparatus that transmits data according to a protocol has a timer, a memory, a processor, and a transmission unit. The processor stores, in the memory, type data indicating a single type of time from a plurality of types of time that are to be measured according to the protocol. The transmission unit transmits data according to the protocol and starts the measurement of time of the type indicated by the type data stored in the memory using the timer after the data has been transmitted.

10 Claims, 11 Drawing Sheets

FIG. 3C

| REQUESTED PROCESS: PACKET RECEPTION | TRANSMISSION DESTINATION/ TRANSMISSION SOURCE ADDRESSES :0x1000_0000 | TRANSMISSION SIZE: 1024Bytes |
|---|---|---|
| CONNECTION IDENTIFIER:0 | TIMER TYPE: RETRANSMISSION TIMER | TIMER OPERATION: STOP |
| | TIMEOUT VALUE :-- | NEXT TIMER INFORMATION ADDRESS :NULL |

FIG. 3D

| REQUESTED PROCESS | TRANSMISSION DESTINATION/ TRANSMISSION SOURCE ADDRESSES | TRANSMISSION SIZE |
|---|---|---|
| CONNECTION IDENTIFIER | TIMER TYPE | TIMER OPERATION |
| | | NEXT TIMER INFORMATION ADDRESS |

| CONNECTION IDENTIFIER | TIMER TYPE | REQUESTED PROCESS | TRANSMISSION DESTINATION/ TRANSMISSION SOURCE ADDRESSES | TRANSMISSION SIZE |
|---|---|---|---|---|
| | | TIMEOUT VALUE | TIMER OPERATION | TIMER EXPIRED NOTIFICATION DESTINATION | NEXT TIMER INFORMATION ADDRESS |

TIMER INFORMATION

0xA000_1000

| CONNECTION IDENTIFIER | TIMER TYPE | | | |
|---|---|---|---|---|
| | | TIMEOUT VALUE | TIMER OPERATION | TIMER EXPIRED NOTIFICATION DESTINATION | NEXT TIMER INFORMATION ADDRESS |

TIMER INFORMATION

FIG. 5B

| CONNECTION IDENTIFIER: 0 | TIMER TYPE: RETRANSMISSION TIMER | REQUESTED PROCESS: PACKET TRANSMISSION | TRANSMISSION DESTINATION/TRANSMISSION SOURCE ADDRESSES: 0x1000_0000 | TRANSMISSION SIZE: 1024Bytes |
|---|---|---|---|---|
| | | TIMEOUT VALUE: 200 ms | TIMER OPERATION: START | TIMER EXPIRED NOTIFICATION DESTINATION: TRANSMISSION PROCESSING CPU | NEXT TIMER INFORMATION ADDRESS: NULL |

FIG. 5C

| CONNECTION IDENTIFIER:0 | TIMER TYPE: RETRANSMISSION TIMER | REQUESTED PROCESS: PACKET RECEPTION | TRANSMISSION DESTINATION/ TRANSMISSION SOURCE ADDRESSES :0x1000_0000 | TRANSMISSION SIZE: 1024Bytes |
|---|---|---|---|---|
| | TIMEOUT VALUE :-- | TIMER OPERATION: STOP | TIMER EXPIRED NOTIFICATION DESTINATION:-- | NEXT TIMER INFORMATION ADDRESS:NULL |

FIG. 5D

| CONNECTION IDENTIFIER | TIMER TYPE | REQUESTED PROCESS | TRANSMISSION DESTINATION/ TRANSMISSION SOURCE ADDRESSES | TRANSMISSION SIZE |
|---|---|---|---|---|
| | | TIMER OPERATION | TIMER EXPIRED NOTIFICATION DESTINATION | NEXT TIMER INFORMATION ADDRESS |

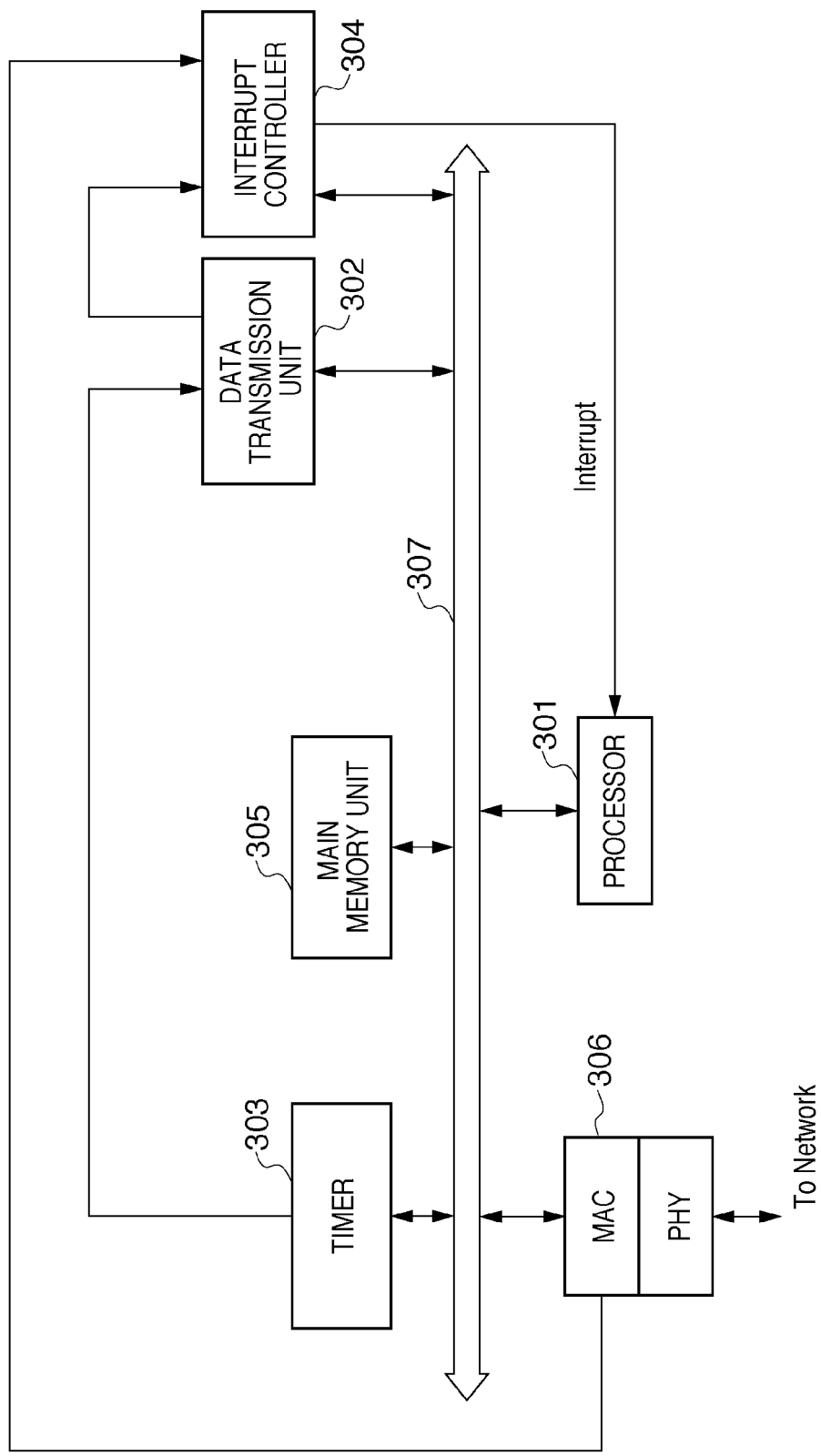

TRANSMISSION APPARATUS THAT TRANSMITS DATA ACCORDING TO A PROTOCOL, AND METHOD FOR MEASURING TIME IN THE TRANSMISSION APPARATUS

BACKGROUND OF THE INVENTION

1. Field of the Invention

The present invention relates to a transmission apparatus that transmits data according to a protocol, and to a method for measuring time in the transmission apparatus.

2. Description of the Related Art

With the spread of gigabit Ethernet® and the like, the ability to execute protocol processing at high speeds is in demand not only for generic PCs but also for embedded devices. It is said that a processor with a processing frequency of approximately 3 GHz is necessary in order to achieve the full-wire speed of gigabit Ethernet®. This greatly exceeds the capabilities of the processors that are generally installed in today's embedded devices. Accordingly, adding a TOE (TCP/IP Offload Engine), which is an auxiliary device designed specifically for protocol processing, to the system in order to implement high-bandwidth network communication is becoming more and more common.

Of great importance in TCP/IP protocol processing is timer processing, which has an integral relationship with protocol processing (see Japanese Patent Laid-Open No. 59-17757). The timer processing is often implemented through a software timer in conventional protocol processing apparatuses. Software timers store timer values in a rewritable storage device, and increment or decrement the timer values in the storage device at set intervals using the processor. The timer is considered to have expired when the timer value reaches a prescribed value, and the processing commences when the timer has expired. With software timers, the number of timers can easily be increased by increasing the capacity of the storage device; however, incrementing or decrementing the counts of all the timers in the storage device at set intervals puts a heavy load on the processor.

A software timer can also be realized by comparing a free running counter that constantly measures time with a timer value in the storage device. With such a software timer, a value obtained by adding a prescribed value to the value of the free running counter at configuration is taken as the timer value. The free running counter and the timer value are compared at a set interval, and the timer is considered to have expired when the two match. Here, as above, while it is not necessary to reset the timer values individually, it is necessary to read out the timer values of all the timers at a set interval and compare them to the free running counter, and thus the increase in the number of timers leads to an increase in the processing load.

Furthermore, in TCP/IP protocol processing, various timers, such as persist timers, delay ACK timers, retransmission timers, keep alive timers, 2MSL (Max Segment Lifetime) timers, and so on, are required at each connection. As a result, when processing several tens to several hundreds of connections, several times that number of timers are required, and thus the processing load for managing the timers will increase almost immeasurably.

Hardware timers (timer controllers) are sometimes used to compensate for the drawbacks of software timers as described above. Such counters are realized by dedicated hardware that has a dedicated register for time counting separate from the memory region and that increments or decrements the count. This dedicated hardware notifies the processor that the timer has expired by outputting an interrupt signal when the timer value reaches a prescribed value. Upon receiving the interrupt signal, the processor temporarily suspends the normal processing, and commences the interrupt process corresponding to the signal after the register, variables, and so on have been saved. Because the processor does not need to increment or decrement the timer value, the load on the processor can be lightened as compared to when using a software timer. It is therefore possible to suppress an increase in traffic to and from the storage device, lighten the processing load on the processor, and so on.

With a timer that uses an interrupt, the interrupt process resulting from the timer is performed in parallel with data transfer any number of times throughout the period in which a TCP connection is established.

Furthermore, in order to implement TCP/IP communication, many timer variables are used based on these timer values. Therefore, it is necessary to secure a sufficient storage region and to use a processor with sufficient timer processing capabilities when performing timer processing in a communications system.

In addition, in a protocol processing apparatus in which the packet transmission/reception processing has been offloaded from the processor, the packet transmission/reception processing is commenced upon a request being made by the processor, and the processor is notified of the completion of the packet transmission/reception processing by an interrupt signal. Having been notified of the completion of the packet transmission/reception processing, the processor starts/stops the timer in accordance with the details of the completed packet transmission/reception processing. With regards to interrupts, U.S. Pat. No. 7,082,486 discloses an interrupt controller capable of performing interrupts by type using an interrupt descriptor table.

With a protocol processing apparatus such as those seen in the aforementioned related art, a timer set including a persist timer, a delay ACK timer, a retransmission timer, a keep alive timer, a 2MSL timer, and so on is necessary per connection when using TCP/IP. When several tens to several hundreds of connections are used, the same number of timer sets as there are connections is used, resulting in a problem that there is an increased load on the processor caused by timer management.

In addition, there are cases, during the transmission/reception of packets, that the delay ACK timer, retransmission timer, and persist timer in this timer set need to be reset frequently, which is a factor in the increase of the load caused by timer management. Furthermore, when a hardware timer is used, the starting/stopping of the timer due to an interrupt also causes processor load. When multiple connections are operating in parallel and timers are frequently started/stopped, the load on the processor increases, reducing the processor resources that can be allocated to other processes.

SUMMARY OF THE INVENTION

It is an object of the present invention to offload the processes associated with timers included in protocol processing from the processor, and lighten the load on the processor.

Another object of the present invention is to provide a transmission apparatus that transmits data according to a protocol, the apparatus comprising a timer, a memory, and a processor that stores, in the memory, type data indicating a single type of time from a plurality of types of time that are to be measured according to the protocol, and a transmission unit that transmits data according to the protocol and starts measuring time of the type indicated by the type data stored in the memory using the timer after the data has been transmitted.

Another object of the present invention is to provide a transmission apparatus that transmits data according to a protocol, the apparatus comprising a memory, a processor that stores control information for data transmission in the memory, a transmission unit that transmits data in accordance with the control information stored in the memory, and a timer that measures one of a plurality of times to be measured in accordance with the protocol used for data transmission.

Further features of the present invention will become apparent from the following description of exemplary embodiments with reference to the attached drawings.

BRIEF DESCRIPTION OF THE DRAWINGS

FIGS. 5A to 5D are diagrams illustrating a packet transmission/reception request according to the second embodiment.

FIG. 6 is a diagram illustrating a system configuration according to a third embodiment.

DESCRIPTION OF THE EMBODIMENTS

Exemplary embodiments of the present invention will now be described in detail in accordance with the accompanying drawings.

First Embodiment

Figure 1:
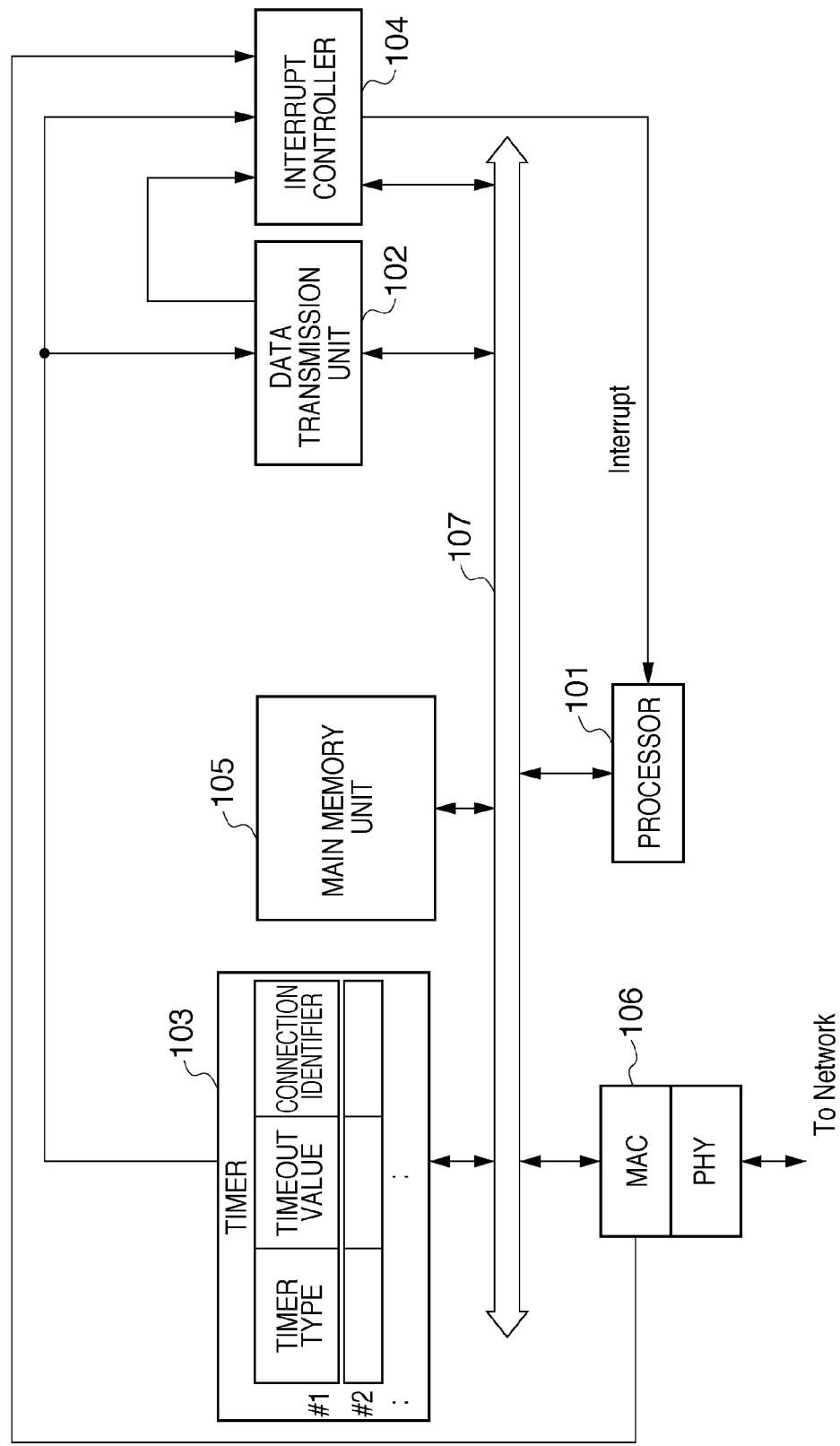
FIG. 1 is a diagram illustrating a system configuration according to a first embodiment.

FIG. 1 is a diagram illustrating an example of the configuration of a system that includes a protocol processing apparatus according to a first embodiment.

In FIG. 1, numeral 101 is a processor that executes general software, such as applications, an OS (operating system), device drivers, and so on. 102 is a data transmission unit that receives a packet transmission/reception request from the processor and performs transmission/reception processing for packets between a main memory unit 105 and a MAC (data link layer)/PHY (physical layer) 106. 103 is a timer, and is used as a retransmission timer, a delay ACK timer, and a persist timer. The timer 103 is capable of measuring multiple times simultaneously.

When the retransmission timer has been started after a packet has been transmitted, and the retransmission timer expires, the transmitted packet is determined to have been lost in the network, and the packet is retransmitted. However, if an ACK packet has arrived before the retransmission timer has expired, the retransmission timer is stopped. Meanwhile, if an ACK response packet is not received before the retransmission timer has expired, the process returns to the sequence number of the previous ACK response packet and retransmits the TCP packet.

The delay ACK timer is started upon a packet being received, and the delay ACK timer is stopped when a different packet is received. When the delay ACK timer has expired, an ACK packet is transmitted to the origin of the packet. The delay ACK timer is set when a packet is received, and is used for a period of standby when an ACK response packet is sent. This standby makes it possible to use a single ACK response packet for multiple packets.

The persist timer is set when the receiving side has advertised a receive window with a size of 0. In this case, the receiving side is in a state incapable of reception, and thus the sending side continues to be in a state incapable of transmitting the packet. At this time, the sending side transmits a packet with a 1-byte payload, called a probing packet, to the receiving side in order to determine the state of the receive window in the receiving side, and waits for an ACK packet to arrive from the receiving side. The persist timer is used to determine the timing at which the probing packet is sent.

The following are set for each measurement performed by the timer 103:
a timer type indicating which of the retransmission timer, delay ACK timer, and persist timer the timer is operating as;
the timeout value of the timer; and
a connection identifier for identifying the connection being used by the timer.

When the timer 103 is started, it measures the set timeout value and asserts an interrupt signal when the timer has expired.

104 is an interrupt controller that notifies the processor 101 of interrupt signals outputted by the timer 103, the MAC/PHY 106, the data transmission unit 102, and so on. 105 is a main memory unit, in which is provided programs executed by the processor 101 and the working area therefor, data and a working area used by the data transmission unit 102, a communication area for the processor 101 and the data transmission unit 102, and so on. 106 is a MAC (data link layer)/PHY (physical layer) of the network, and connects to another network device via a switch, hub, router, or the like (not shown) that is present on the network. Numeral 107 is a bus that connects the processor 101, data transmission unit 102, timer 103, interrupt controller 104, main memory unit 105, and MAC/PHY 106.

Figure 2:
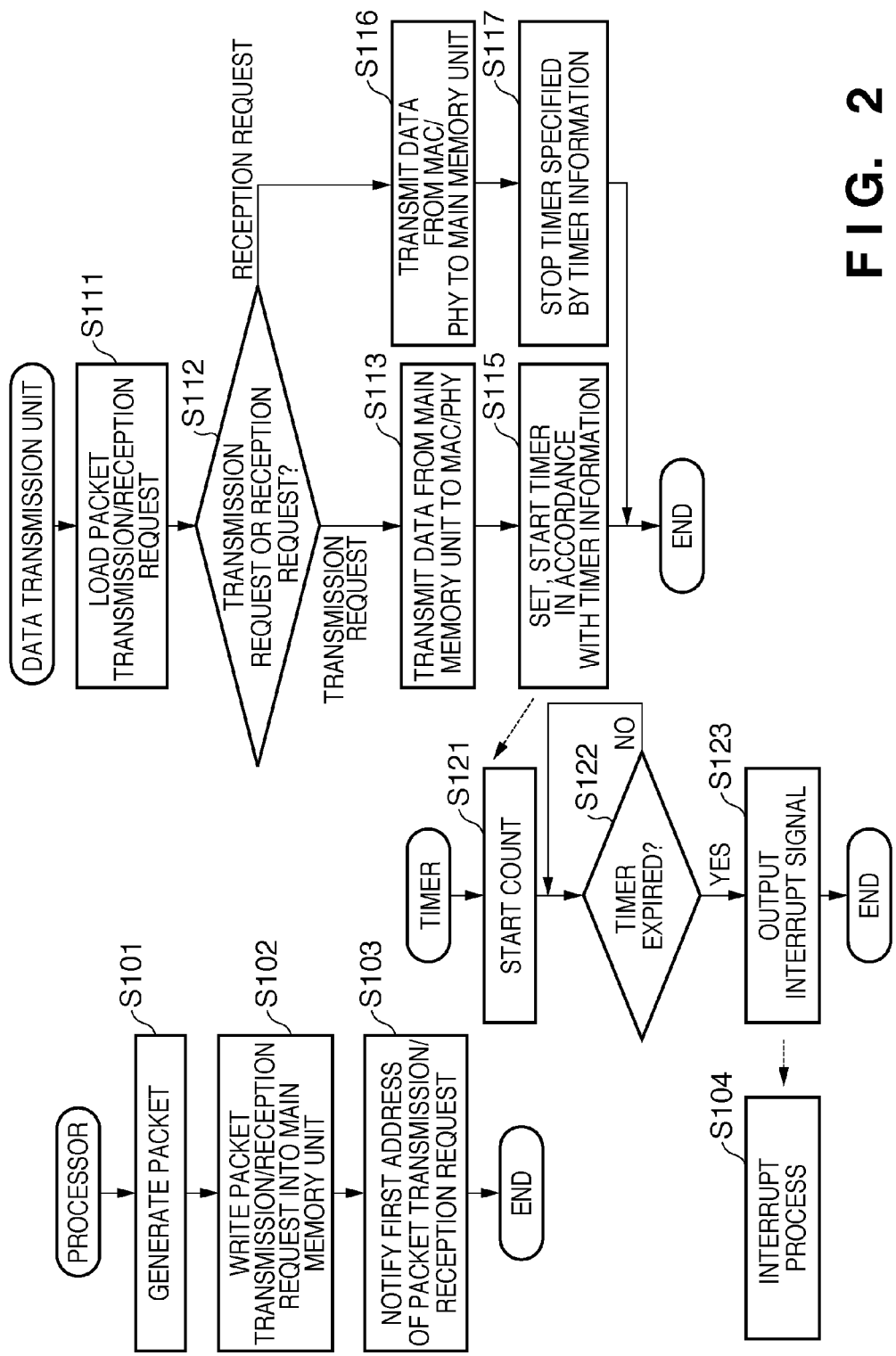
FIG. 2 is a flowchart illustrating protocol processing according to the first embodiment.

Next, operations of the protocol processing apparatus shown in FIG. 1 is described. Note that although the retransmission timer, delay ACK timer, persist timer, and so on are available as the timer 103 of the protocol processing apparatus, the descriptions of the present embodiment shall discuss the retransmission timer. FIG. 2 is a flowchart illustrating a data communication process according to the first embodiment.

First, operations performed when a packet is transmitted shall be described. When streaming over TCP is requested by a user application program operated by the processor 101, the processor 101 generates packets from stream data in the main memory unit 105 (Step S101 in FIG. 2). After the packets have been generated, the processor 101 writes a packet transmission/reception request for the data transmission unit 102 into the main memory unit 105 (Step S102).

Figure 3:
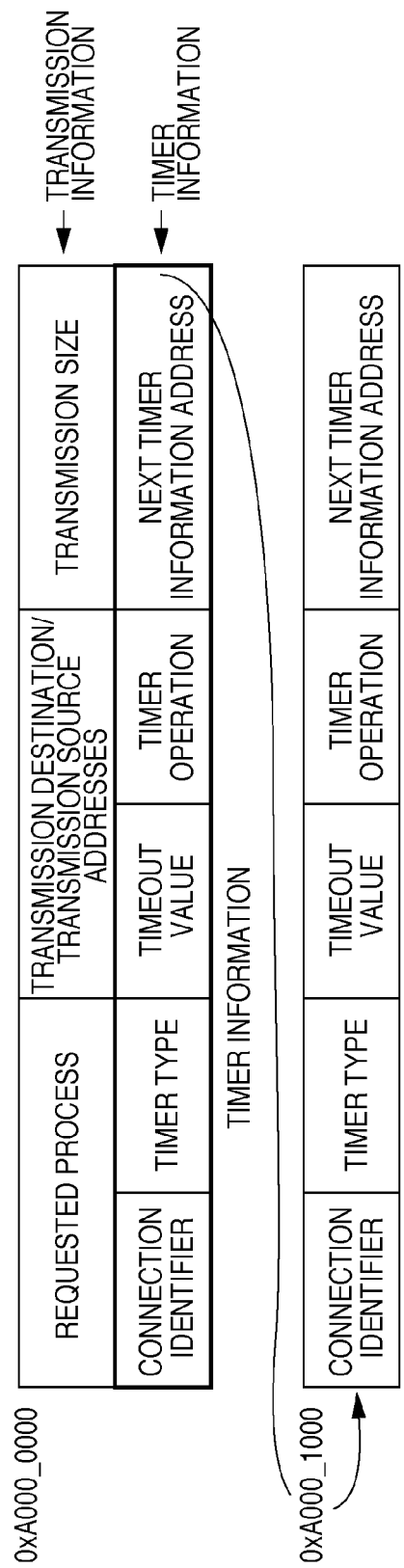
FIGS. 3A to 3D are diagrams illustrating a packet transmission/reception request according to the first embodiment.

The packet transmission/reception request of the present embodiment is composed of transmission information and timer information, as shown in FIG. 3A.

The transmission information includes:

a requested process indicating whether to cause the data transmission unit 102 to carry out a packet transmission process or a packet reception process;

transmission destination/transmission source addresses indicating the first address in the main memory unit 105 of the packet to be sent when the packet transmission process request is made and the first address of the packet to be received in the main memory unit 105 that stores the packet when the packet reception process request is made; and a transmission size indicating the amount of data to be transmitted.

Meanwhile, the timer information includes:

a connection identifier for identifying the connection to be used when performing the packet transmission/reception process;

a timer type indicating the type of the timer operated after the packet transmission/reception process;

the timeout value of the timer;

a timer operation indicating the timeout value and whether to start or stop the timer; and a next timer information address indicating the address of the next timer information, for the case where multiple timers are operated after the packet transmission/reception process.

In the present embodiment, an example in which the timeout value of the timer 103 is set is provided; however, the timeout value is unnecessary in the timer information data structure in the case where the timeout value can be fixed depending on the timer type, and thus is as shown in FIG. 3D.

For example, assume that the identifier of the connection requesting streaming transmission is 0, the first address of the packet to be transmitted is 0x1000_0000, and the transmission size is 1024 bytes. In this case, the processor 101 writes the packet transmission/reception request (transmission request) shown in FIG. 3B into the main memory unit 105. Accordingly, the main memory unit 105 functions as a holding unit that holds the packet transmission/reception request from the processor 101 that includes the transmission information for packet transmission/reception and the timer information for controlling (operating) the timer.

After the packet transmission/reception request has been written into the main memory unit 105, the processor 101 notifies the data transmission unit 102 of the first address of the packet transmission/reception request that has been written into the main memory unit 105 (Step S103).

The data transmission unit 102 reads out the packet transmission/reception request from the notified address of the main memory unit 105 (Step Sill). Then, the data transmission unit 102 determines whether the read-out packet transmission/reception request is a transmission request or a reception request (Step S112). Here, the request is a transmission request, and thus the data transmission unit 102 reads out the data of the amount specified by the transmission size from the address of the main memory unit 105 specified by the transmission destination/transmission source addresses, in accordance with the read-out packet transmission/reception request, and transmits that data to the MAC/PHY 106 (Step S113). In this manner, the data transmission unit 102 executes a process for transmitting data between a memory and the data link layer in accordance with the transmission information included in the transmission/reception request held in the main memory unit 105. After a packet has been transmitted to the MAC/PHY 106, the data transmission unit 102 sets the connection identifier, timer type, and timeout value in the timer 103 based on the timer information included in the packet transmission/reception request, and starts the time measurement (Step S115). In other words, the data transmission unit 102 of the present embodiment also functions as a timer control unit that operates a timer in accordance with the timer information included in the transmission/reception request after the process for transmitting data has been completed. In the case of the transmission/reception request shown in FIG. 3B, the timer type is a retransmission timer, and the timer operation is "start", and thus the retransmission timer is started.

The timer 103 commences the count according to the set timer (Step S121). When the timer has measured time up to the timeout value, a timer expired interrupt is outputted (Steps S122 and S123).

The processor 101 is notified of the interrupt signal outputted from the timer 103 via the interrupt controller 104. Having been notified of the interrupt, the processor 101 reads out, from the timer 103, the connection identifier and timer type set for the expired time measurement. In other words, the processor 101 reads out, from the timer that notified the expiration, the connection identifier and timer type of that timer. The connection with which processing is to be performed is then specified by the read-out connection identifier, and the interrupt process to be carried out is specified by the timer type (Step S104). For example, in the above example, the timer is of the retransmission timer type, and thus the processor 101 commences the packet retransmission process on the connection indicated by the connection identifier.

Next, operations performed when a packet is received shall be described. Upon receiving a packet from the network, the MAC/PHY 106 asserts an interrupt signal, which is how the processor 101 is notified by the interrupt controller 104. Having been notified of the interrupt, the processor 101 reads out the IP header and TCP header from the buffer of the MAC/PHY 106 in which the received packet is stored. The processor 101 determines the connection identifier based on the transmission source/reception destination IP addresses within the IP header. Meanwhile, in the case where the ACK flag in the TCP header is set and the confirmation response number is equivalent to the sequence number of the last data transmitted at that point in time plus 1, the processor 101 writes the packet transmission/reception request (reception request) shown in FIG. 3C into the main memory unit 105. After the packet transmission/reception request has been written into the main memory unit 105, the processor 101 notifies the data transmission unit 102 of the first address of the packet transmission/reception request in the main memory unit 105. Note that the operations of the processor 101 described above have been omitted from the flowchart in FIG. 2.

The data transmission unit 102 reads out the packet transmission/reception request from the first address in the main memory unit 105 it was notified of (Step S111). Then, data of an amount equivalent to the size specified by the transmission size is read out from the buffer of the MAC/PHY 106 in accordance with the read-out packet transmission/reception request (here, this is a reception request), and is written into the address specified by the transmission destination/transmission source addresses in the main memory unit 105. This process is indicated by Steps S112 and S116 in FIG. 2. In FIG. 3C, the timer operation is "stop", and thus after the data is written into the main memory unit 105, the data transmission unit 102 stops the time measurement performed by the timer specified by the connection identifier and the timer type (Step S117). In this manner, the main memory unit 105 holds the transmission/reception request from the processor 101 that includes transmission information for packet transmission/reception and timer information for timer control in the reception process as well. The data transmission unit 102 then executes the process of transmitting data from the buffer of the data link layer into the main memory unit 105 in accordance with the transmission information included in the transmission/reception request held in the main memory unit 105. The data transmission unit 102 also functions as a timer control unit that controls (operates) the timer in accordance with the timer information included in the transmission/reception request after the data transmission process has been completed. In this example of packet reception, the time measurement of the timer 103 specified by the connection identifier and timer type in the timer information is stopped.

When multiple timers are started/stopped for a single packet transmission/reception request, the start address of the next timer information is stored in the next timer information within the timer information, and the timers that are to be operated are listed. In Step S115 or Step S116, the data transmission unit 102 retrieves the listed timer information and operates the timers in order after the packet transmission/reception process has ended.

As described thus far, according to the first embodiment, offloading the operations for starting/stopping the timers, which have an integral relationship with protocol processing, from the processor makes it possible to reduce the load placed on the processor. Furthermore, because the processor resources can be allocated to other protocol processing, the speed of the protocol processing can be increased.

Second Embodiment

Figure 4:
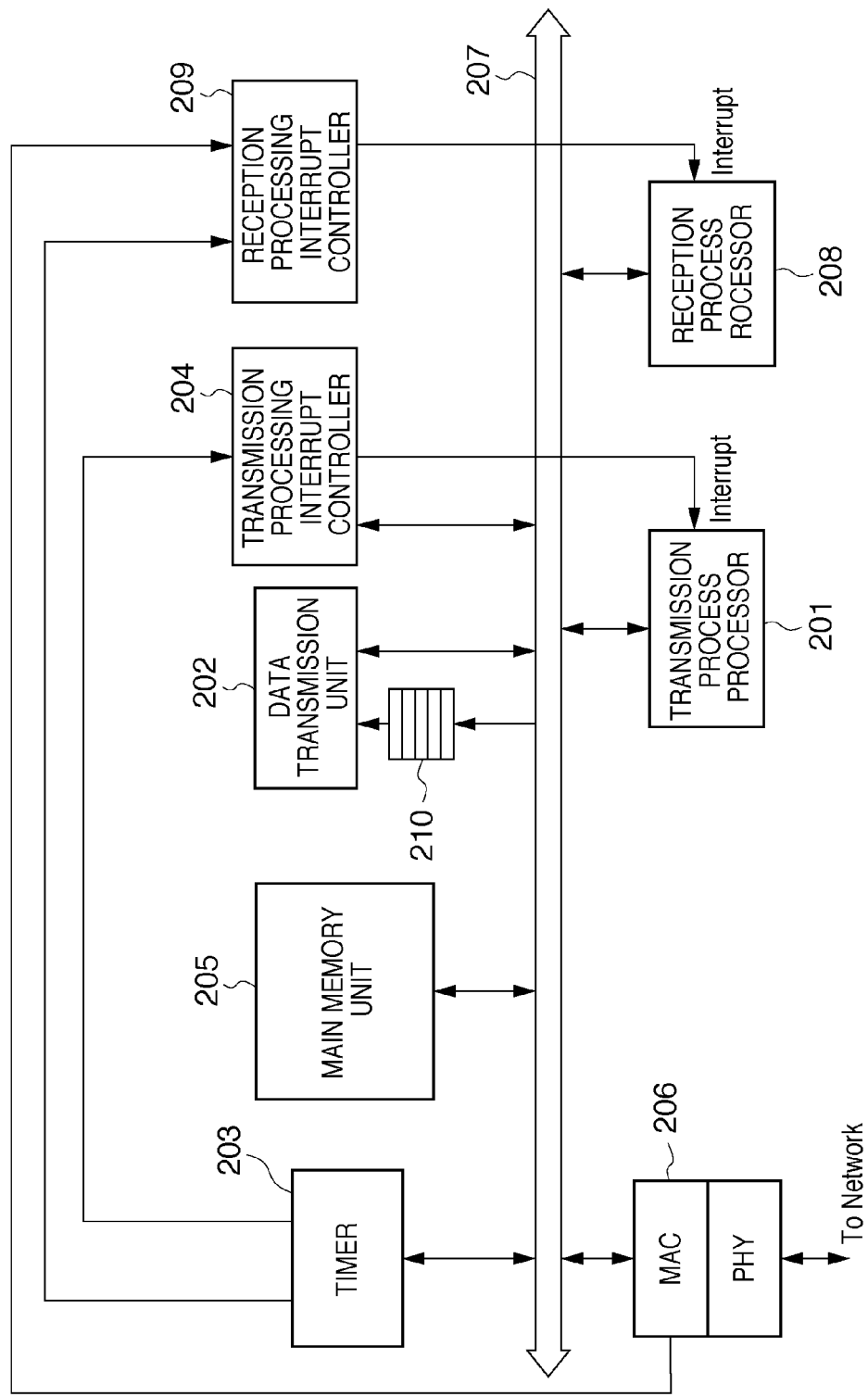
FIG. 4 is a diagram illustrating a system configuration according to a second embodiment.

FIG. 4 is a diagram illustrating an example of the configuration of a system that includes a protocol processing apparatus according to a second embodiment.

In FIG. 4, a transmission process processor 201 is a processor for TCP/IP transmission processing, whereas a reception process processor 208 is a processor for TCP/IP reception processing. 202 is a data transmission unit that receives packet transmission/reception requests from the transmission process processor 201 and reception process processor 208, and transmits packets between a main memory unit 205 and a MAC/PHY 206. 210 is a packet transmission/reception request storage unit that stores packet transmission/reception requests when the packet transmission/reception requests cannot be accepted from the transmission process processor 201, the reception process processor 208, and the like due to the data transmission unit 202 being in the midst of packet transmission/reception processing. To be more specific, the first address in the main memory unit 205 in which the packet transmission/reception request is stored is stored in the packet transmission/reception request storage unit 210. It should be noted that the configuration may be such that the transmission process processor 201 checks the status of the data transmission unit 202, and upon determining that a packet transmission/reception request cannot be received, stores the storage address of the packet transmission/reception request in the packet transmission/reception request storage unit 210.

203 is a timer, used as a retransmission timer, a delay ACK timer, a persist timer, or the like. The timer 203 is capable of measuring multiple times simultaneously.

The following are set for each measurement performed by the timer 203:

a timer type indicating which of the retransmission timer, delay ACK timer, and persist timer the timer is operating as;
  the timeout value;
  a connection identifier for identifying the connection being used by the timer; and
a timer expired notification recipient, indicating the recipient of an interrupt notification when the timer has expired.

In the second embodiment, the timer 203 that has been started measures up to the set timeout value. The, when the timer has expired, the timer 203 asserts an interrupt signal to the interrupt notification recipient that has been set, through cooperation with a transmission processing interrupt controller 204, a reception processing interrupt controller 209, and the like.

204 and 209 are a transmission processing interrupt controller and a reception processing interrupt controller, respectively, and notify the transmission process processor 201, the reception process processor 208, and the like of interrupt signals from the timer 203, interrupt signals from the MAC/PHY 206, and so on. 205 is a main memory unit in which are provided programs executed by the transmission process processor 201 and the reception process processor 208 as well as a working area for those programs. Furthermore, data and a working area used by the data transmission unit 202, an area for communication between the data transmission unit 202 and each of the transmission process processor 201 and reception process processor 208 and so on are provided in the main memory unit 205. 206 is a MAC (data link layer)/PHY (physical layer) of the network, and connects to another network device via a switch, hub, router, or the like (not shown) that is present on the network. 207 is a bus that connects the abovementioned components.

Next, operations of the protocol processing apparatus according to the second embodiment shall be described. Although retransmission timers, delay ACK timers, persist timers, and the like exist for protocol processing executed by the protocol processing apparatus, descriptions of the present embodiment shall be given using a retransmission timer. Note that the flowchart shown in FIG. 2 shall also be used to illustrate the operations of the protocol processing apparatus in the second embodiment as well.

When streaming over TCP is requested by a user application program operated by the transmission process processor 201, the transmission process processor 201 generates packets from stream data in the main memory unit 205 (Step S101). After the packets have been generated, the transmission process processor 201 writes a packet transmission/reception request for the data transmission unit 202 into the main memory unit 205 (Step S102).

As shown in FIG. 5A, the packet transmission/reception request is configured of timer information including the following:

a requested process indicating whether to cause the data transmission unit 202 to carry out a packet transmission process or a packet reception process;

transmission destination/transmission source addresses indicating the first address of the packet in the main memory unit 205 that is to be transmitted when a packet transmission process request has been made, and indicating the first address of the packet to be received in the main memory unit 205 that stores that packet when a packet reception process request has been made; and a transmission size indicating the amount of data to be transmitted.

In addition to these pieces of information (transmission information), the timer information also includes the following:

a connection identifier for identifying the connection to be used when performing the packet transmission/reception process;

a timer type indicating the type of the timer operated after the packet transmission/reception process;

the timeout value of the timer;

a timer operation indicating whether to start/stop the timer, and a timer expired notification recipient, indicating the recipient of an interrupt notification when the timer has expired; and a next timer information address indicating the address of the next timer information, for the case where multiple timers are operated after the packet transmission/reception process.

Note that although a timeout value is set for the timer 203 in the present embodiment, the timer information is as shown in FIG. 5D in the case where the timeout value is fixed in accordance with the timer type. For example, assume that the identifier of the connection requesting streaming transmission is 0, the first address of the packet to be transmitted is 0x1000_0000, and the transmission size is 1024 bytes. In this case, the transmission process processor 201 writes the packet transmission/reception request shown in FIG. 5B into the main memory unit 205. In other words, the main memory unit 205 functions as a holding unit that holds a transmission/reception request from the transmission process processor 201 that includes transmission information for packet transmission/reception and timer information for timer operations.

Next, the transmission process processor 201 notifies the data transmission unit 202 of the first address of the packet transmission/reception request (Step S103). In the second embodiment, the configuration is such that the transmission process processor 201 first stores the address in the packet transmission/reception request storage unit 210, and then the data transmission unit 202 reads out the address that has been stored in the packet transmission/reception request storage unit 210. In the first embodiment, the data transmission unit 102 is notified of the first address directly by the processor 101. However, in the second embodiment, the data transmission unit is notified of the first address of the packet transmission/reception request by the transmission process processor 201 (or the reception process processor 208) via the packet transmission/reception request storage unit 210. The packet transmission/reception request storage unit 210 functions as a registration unit that registers the storage address of the transmission/reception request held in the main memory unit 205.

In the case where an address is stored in the packet transmission/reception request storage unit 210, the data transmission unit 202 reads out the address stored first in the packet transmission/reception request storage unit 210. In other words, the addresses present in the packet transmission/reception request storage unit 210 are read out in order started from the address that is stored first. Then, the data transmission unit 202 reads out the packet transmission/reception request from the address in the main memory unit 205 (Step S111). Note that the read-out address is deleted from the packet transmission/reception request storage unit 210. The timing at which the address is deleted may be set so that the deletion occurs after the address has been read out from the packet transmission/reception request storage unit 210 and before the next address is read out from the packet transmission/reception request storage unit 210. In the present embodiment, the deletion is performed at the same time as the readout. Then, the data transmission unit 202 reads out the data of the amount specified by the transmission size from the address specified by the transmission destination/transmission source addresses, in accordance with the read-out packet transmission/reception request, and transmits that data to the MAC/PHY 206 (Steps S112 and S113). After a packet has been transmitted to the MAC/PHY 206, the data transmission unit 202 sets the connection identifier, timer type, timeout value, and timer expired notification recipient in the timer 203 based on the timer information, and starts the time measurement (Step S115). In this manner, the data transmission unit 202 reads out the transmission/reception request from the main memory unit 205 in accordance with the storage address registered in the packet transmission/reception request storage unit 210 that serves as a registration unit, and executes the data transmission process and the timer operations.

When time has been measured up to the timeout value set in the timer 203, the processor specified as the timer expired notification recipient (in this case, the transmission process processor 201) is notified of an interrupt via the transmission processing interrupt controller 204 (Steps S121 and S122). In other words, the timer information includes notification recipient information indicating the processor that receives a notification when the timer has expired, as described above. Then, when the timer has expired, the timer 203 notifies the processor indicated in the notification recipient information included in the corresponding timer information of the expiration (provides a notification of an interrupt). Having been notified of the interrupt, the transmission process processor 201 reads out the connection identifier and timer type set for the expired time measurement from the timer 203. The transmission process processor 201 then specifies the connection to be used for processing based on the read-out connection identifier and the process to be performed based on the timer type, and executes the process (Step S104). In the case where the packet transmission/reception request shown in FIG. 5B is processed, the transmission process processor 201 starts a packet retransmission process for the connection indicated by a connection identifier 0.

Next, data reception processing shall be described. The MAC/PHY 206 asserts an interrupt signal upon receiving a packet from the network. The reception processing interrupt controller 209 notifies the reception process processor 208 of this interrupt signal. Having been notified of the interrupt, the reception process processor 208 reads out the IP header and TCP header from the buffer of the MAC/PHY 206 in which the received packet is stored. The reception process processor 208 determines the connection identifier based on the transmission source/reception destination IP addresses within the IP header. Meanwhile, in the case where the ACK flag in the TCP header is set and the confirmation response number is equivalent to the sequence number of the last data transmitted at that point in time plus 1, the reception process processor 208 writes the packet transmission/reception request shown in FIG. 5C into the main memory unit 205.

After the packet transmission/reception request has been written into the main memory unit 205, the reception process processor 208 stores the first address of the packet transmission/reception request in the main memory unit 205 into the packet transmission/reception request storage unit 210.

In the case where an address is stored in the packet transmission/reception request storage unit 210, the data transmission unit 202 reads out the packet transmission/reception request from the main memory unit 205 using the address stored first in the packet transmission/reception request storage unit 210 (step S111). Then, data of an amount equivalent to the size specified by the transmission size is read out from the buffer of the MAC/PHY 206 in accordance with the read-out packet transmission/reception request, and is written into the address specified by the transmission destination/transmission source addresses in the main memory unit 205 (Steps S112 and S116). After the data is written into the main memory unit 205, the data transmission unit 202 stops the time measurement performed by the timer 203 specified by the connection identifier and the timer type (Step S117).

As described thus far, according to the second embodiment, the operations for starting/stopping the timers, which have an integral relationship with protocol processing, are offloaded from the processors even in the case where the protocol processing is executed by multiple processors, which makes it possible to reduce the load placed on the processors. Furthermore, because the processor resources can be allocated to other protocol processing, the speed of the protocol processing can be increased. Although the processors in the second embodiment are divided into a transmission processing processor and a reception processing processor, it should be noted that the system may be provided with multiple processor capable of transmission processing or multiple processors capable of reception processing. Multiple processors capable of both transmission and reception processing may be provided as well.

Furthermore, the protocol processing apparatus of the second embodiment includes a packet transmission/reception request storage unit 210 that temporarily stores a packet transmission/reception process request from a processor. Through this, the standby time for the processor can be reduced even in the case where several packet transmission/reception requests occur in rapid succession due to the simultaneous operation of multiple processors, faster protocol processing, and so on.

As described thus far, according to the first and second embodiments, offloading the operations for starting/stopping the timers, which have an integral relationship with protocol processing, from the processor makes it possible to reduce the load placed on the processor. Furthermore, because the processor resources can be allocated to other protocol processing, the speed of the protocol processing can be increased as well.

Finally, providing a unit that temporarily stores the packet transmission/reception process requests from the processor makes it possible to reduce the standby time for the processor even in the case where several packet transmission/reception requests occur in rapid succession due to the simultaneous operation of multiple processors, faster protocol processing, and so on.

Third Embodiment

FIG. 6 is a block diagram illustrating an example of the configuration of a protocol processing apparatus including a network timer apparatus according to a third embodiment.

In FIG. 6, 301 is a processor that executes software. 302 is a data transmission unit that moves data during transmission and reception. 303 is a timer that measures the time necessary for a network process. 304 is an interrupt controller that notifies the processor that data transmission has ended, a timer has expired, and so on. 305 is a main memory unit that holds processor control information, data, transmission/reception data, and so on. 306 is a data link layer and physical layer device for connecting to the network (called a MAC/PHY hereinafter). 307 is a bus that connects the abovementioned components.

Next, the protocol processing apparatus according to the third embodiment shall be described. Although the operations for starting and stopping the timer are offloaded from the processor in the first and second embodiments, in the third embodiment, part of the interrupt processing occurring when a timer expires is offloaded from the processor.

Figure 7:
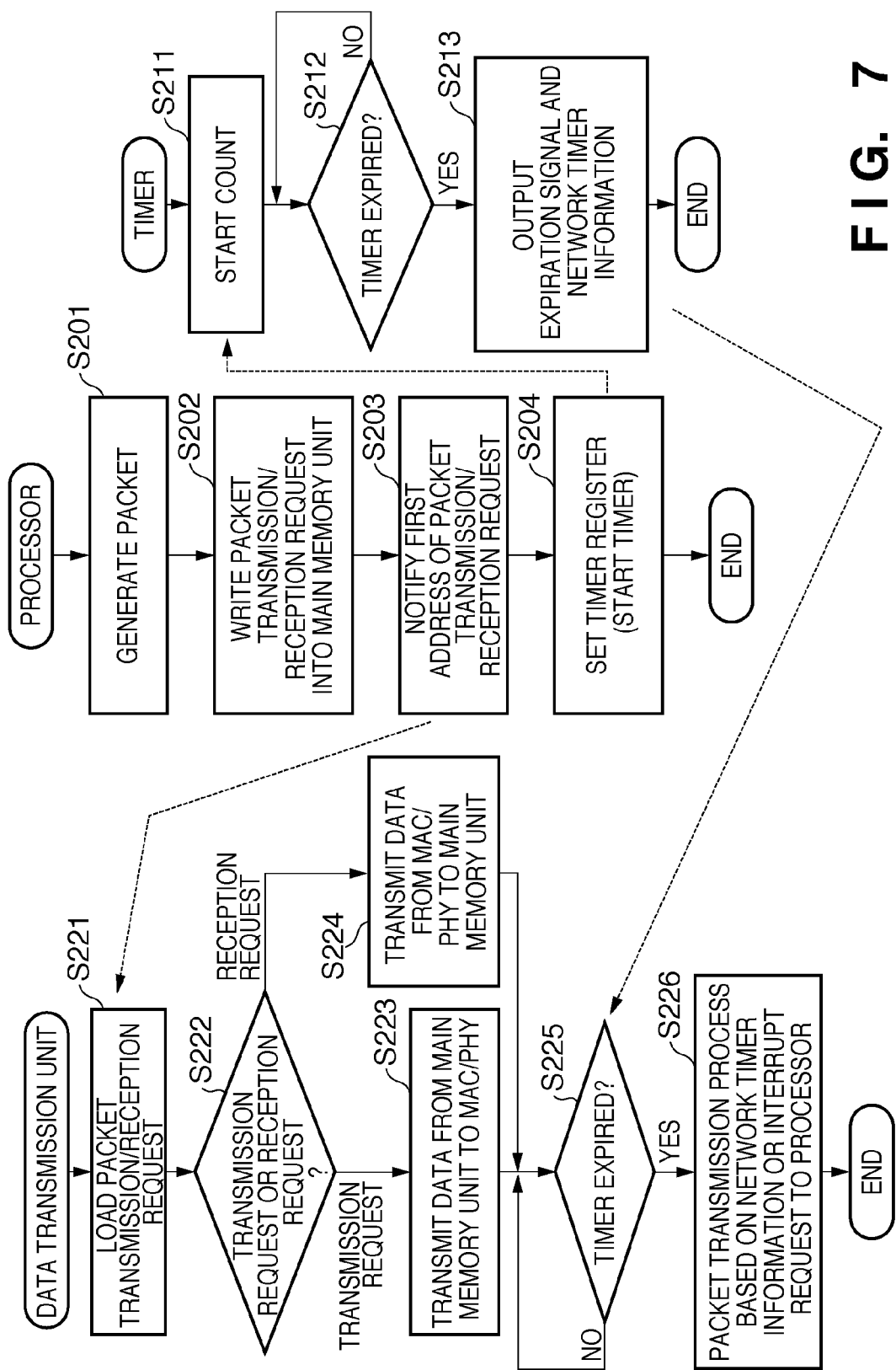
FIG. 7 is a flowchart illustrating protocol processing according to the third embodiment.

Operations of the protocol processing apparatus according to the third embodiment shall be described with reference to the flowchart in FIG. 7. When streaming over TCP is requested by a user application program operated by the processor 301, the processor 301 generates packets from stream data in the main memory unit 305 (Step S201). After the packets have been generated, the processor 301 writes a packet transmission/reception request for the data transmission unit 302 into the main memory unit 305 (Step S202).

Here, the packet transmission/reception request has transmission information including, for example, the following:

a requested process indicating whether to cause the data transmission unit 302 to carry out a packet transmission process or a packet reception process;

a transmission destination/transmission source addresses indicating the first address in the main memory unit 305 of the packet to be transmitted when a packet transmission process request has been made, and the first address of the packet to be received in the main memory unit 305 that stores that packet when a packet reception process request has been made; and a transmission size indicating the amount of data to be transmitted.

The packet transmission/reception request of the third embodiment differs from that of the first and second embodiments in that it does not have the "timer information" such as that indicated in FIGS. 3A to 3D. The processor 301 sets and controls the timer 303 without going through the data transmission unit 302.

After the packet transmission/reception request has been written into the main memory unit 305, the processor 301 notifies the data transmission unit 302 of the first address of the packet transmission/reception request in the main memory unit 305 (Step S203).

The data transmission unit 302 reads out the packet transmission/reception request from the main memory unit 305 using the notified address (Step S221). Then, the data transmission unit 302 determines whether the read-out packet transmission/reception request is a transmission request or a reception request (Step S222). In the case of a transmission request, the data transmission unit 302 reads out the data of the amount specified by the transmission size from the address specified by the transmission destination/transmission source addresses, in accordance with the read-out packet transmission/reception request, and transmits that data to the MAC/PHY 306 (Steps S223). Meanwhile, in the case of a reception request, the data transmission unit 302 reads out data of an amount equivalent to the size specified by the transmission size from the buffer of the MAC/PHY 306, and writes the data into the address specified by the transmission destination/transmission source addresses in the main memory unit 305 (Step S224). In this manner, the data transmission unit 302 functions as a first transmission unit that executes a process for transmitting data between a memory (the main memory unit 305) and the data link layer (the MAC/PHY 306) in accordance with a transmission/reception request from the processor 301.

After data transmission between the main memory unit 305 and the MAC/PHY 306 ends, the processor 301 sets the timer register of the timer 303 and starts the timer necessary for the protocol processing.

The timer 303 of the third embodiment is a network timer device designed specifically for network processing. The timer 303 has multiple timer registers therewithin, and in each timer register, a timer value to which to count and network timer information including a connection identifier and timer type for specifying the communication destination are registered. When a timer value and network timer information are registered in a register, the processor 301 commences the operations of the timer 303. Note that in the present embodiment, timer operation information, such as "setup", "abandon", and so on, is present. Therefore, in Step S204, the processor 301 controls timer setup, abandonment, and so on based on the timer operation information that indicates the setup, abandonment, and so on of the timer related to the transmission/reception process.

Figure 8:
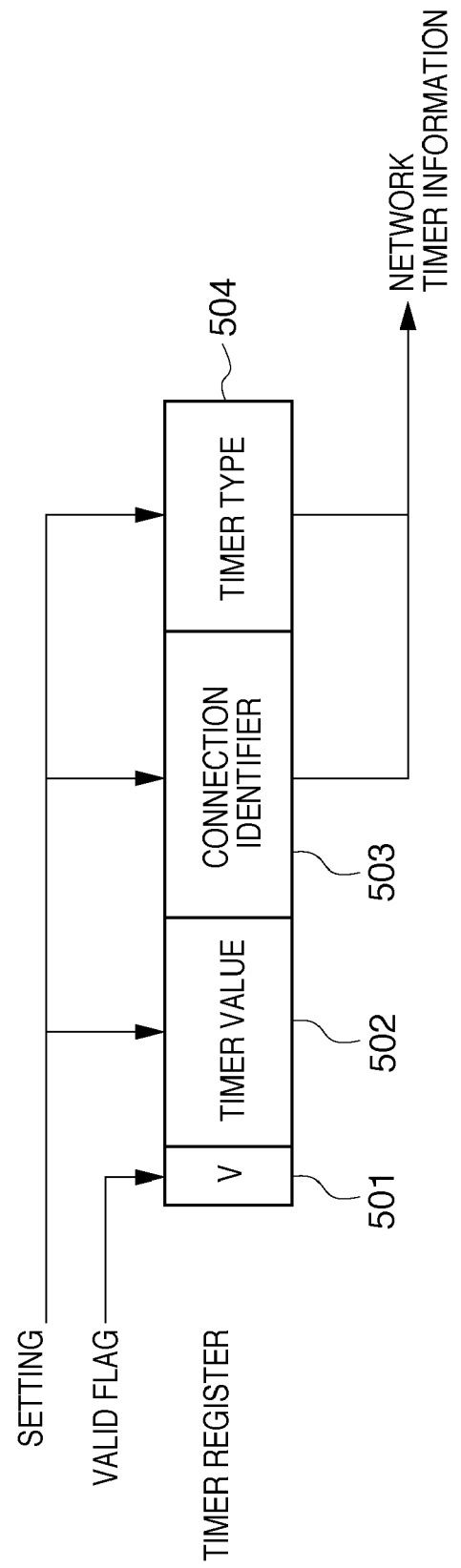
FIG. 8 is a diagram illustrating an example of the configuration of a timer register according to the third embodiment.

FIG. 8 is a diagram illustrating information registered in a timer register of the timer 303 according to the third embodiment. When multiple timers are set up, timer registers are provided for each of those multiple timers. In FIG. 8, a valid flag is stored in a valid flag field 501. The valid flag being in a valid state indicates that time is being measured, whereas the valid flag being in a non-valid state indicates that time measurement has been stopped or has ended. Tick values for measuring time are written into a timer value field 502. The timer 303 of the present embodiment handles the amount of time from one event occurring to the next event occurring, or in other words, the amount of elapsed time.

A connection identifier is stored in a connection identifier field 503. Because the timer 303 is designed specifically for network processing, the connection identifier information is used for control of other modules operating in cooperation with the timer. Note that the connection identifier is information for specifying the communication partner, and in TCP/IP indicates four pieces of information, or the device's own IP address, the partner's IP address, the device's own port number, and the partner's port number. The connection can be specified based on the connection identifier. Information specifying the type of timer used in each connection is stored in a timer type field 504. Multiple timers are used in each connection in TCP/IP. Various types of timers are used, such as, for example, connection establishment timers, retransmission timers, delay ACK timers, persist timers, TIME_WAIT timers, FIN_WAIT timers, FIN_WAIT2 timers, and so on. A timer type, indicating which of these the timer is, is stored in the timer type field 504. When one of the timers expires, the timer 303 outputs the connection identifier and timer type to the data transmission unit 302, and invalidates the flag in the timer register.

An "abandon" timer operation being received indicates that the time measurement is to be stopped immediately, and the time measurement is abandoned by invalidating the valid flag in the timer register specified by the connection identifier and timer type.

The timer 303 commences the count of the timer set through an instruction from the processor 301 as described above (Step S211). Then, in the case where the timer has expired (Step S212), the network timer information (connection identifier and timer type) registered in the corresponding timer register is sent to the data transmission unit 302 (Step S213).

Having received the connection identifier and timer type, the data transmission unit 302 executes data transmission processing, makes interrupt requests to the processor 301, and so on based on the received information (Steps S225 and S226). The data transmission unit 302 manages the set-up timer in such a manner. The data transmission unit 302 thus functions as a second transmission unit that determines the packet to be transmitted based on the network timer information corresponding to the timer that has expired, and executes a data transmission process between the memory and the data link layer in order to carry out the transmission.

For example, when the data transmission unit 302 transmits data in Step S226, a descriptor address is specified based on the connection identifier and the timer type. The descriptor is information necessary for data transmission, and is stored in the main memory unit 305 or the like in advance. The descriptor is, for example, the packet transmission/reception request written into the main memory unit 305 by the processor 301 in Step S202 in FIG. 7. For example, the transmission order of the data (i.e. the address range and destination to which the data is to be transmitted) is written in the descriptor. Prior to the data transmission, the data transmission unit 302 loads the specified descriptor from the main memory unit 305 and transmits the data in accordance with the loaded descriptor. In other words, a descriptor corresponding to the timer type or the network timer information is prepared, in advance, in the main memory unit 305 or the like. The data transmission unit 302 then reads out, from the main memory unit 305, the descriptor corresponding to the connection identifier and timer type outputted by the timer when the timer expires, and executes the data transmission process using the read-out descriptor. This makes it possible for the data transmission unit 302 to automatically commence data transmission when the timer expires. Furthermore, as shall be described later, there are cases where it is desirable to make an interrupt request to the processor, depending on the timer type. In such a case, the data transmission unit 302 outputs an interrupt and notifies the processor 301 that the output is from the timer 303 (Step S226). In other words, the data transmission unit 302 has a function for determining whether or not to make an interrupt request to the processor 301 based on the timer type.

Next, descriptions shall be given regarding operations in the case where a network timer used in TCP/IP, which is widely used for communication between computers, is implemented by a protocol processing apparatus configured as described above.

Figure 9:
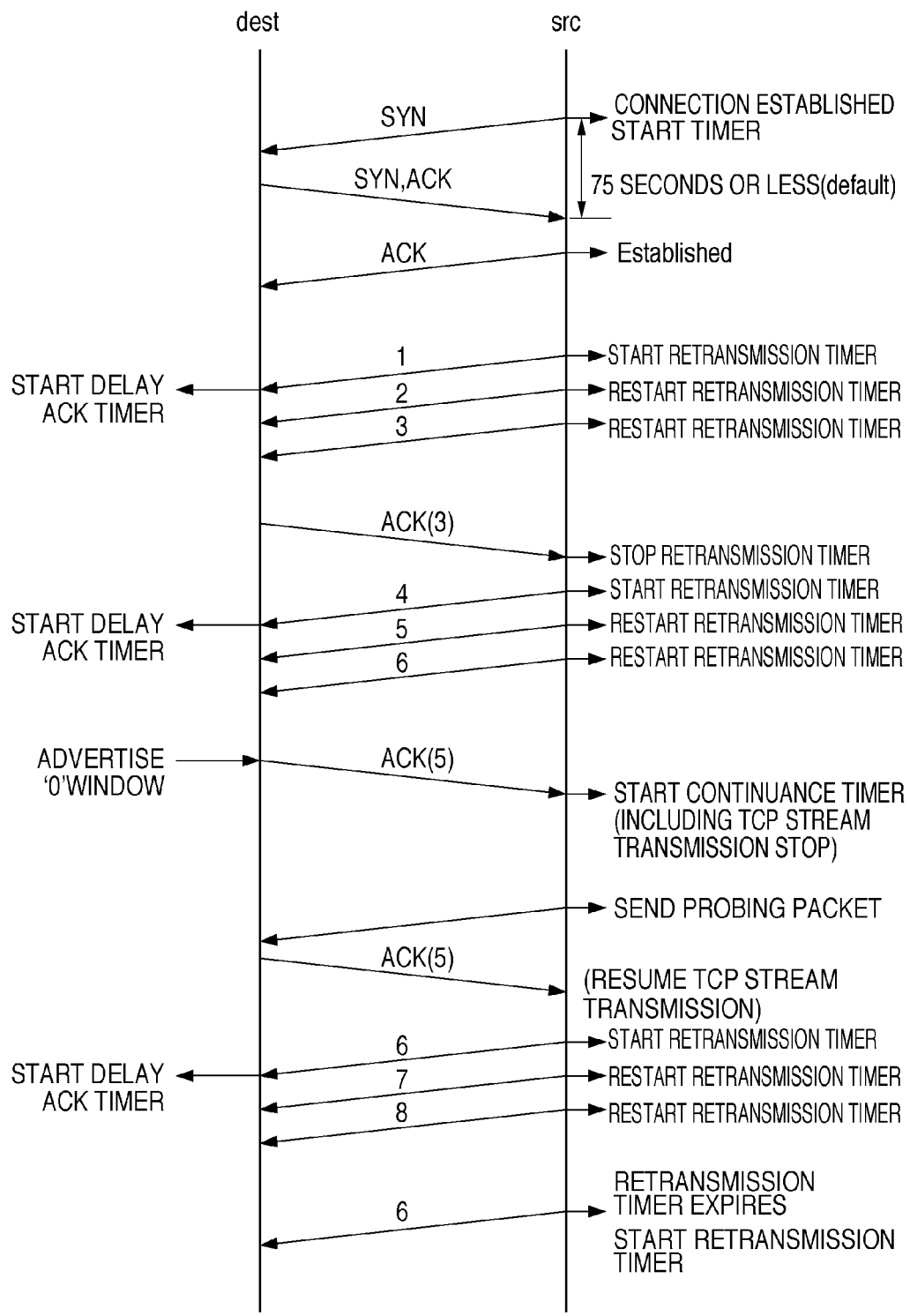
FIG. 9 is a diagram illustrating an example of a sequence chart according to the third embodiment.

FIG. 9 illustrates, as a sequence chart, the state of transmission/reception of packets between communication devices that are performing general TCP/IP communication. In FIG. 9, "src" indicates an active communication device that is actively attempting to establish a connection (the "src side", hereinafter). Meanwhile, "dst" indicates a passive communication device that communicates in response to a connection establishment request from the src side (the "dst side", hereinafter). In TCP/IP, connections are established using a scheme called a "3-way handshake". First, the src side sends a TCP packet with the SYN flag set to the dst side, and starts a connection establishment timer. The four variables in the transmitted packet, or the IP address and port number of the src side and the IP address and port number of the dst side correspond to the connection identifier. This connection identifier is a unique number, and the same identifier is never allocated to a different combination of four variables; therefore, the IP addresses and port numbers of the src side and dst side can be found from the connection identifier. Furthermore, variables indicating the communication status of the connection are associated with the connection identifier.

The connection establishment timer is a timer that is used only once when a connection is established, and thus is not used again thereafter. Furthermore, the processing performed upon the connection establishment timer expiring is processing performed mostly to free up the variable region prepared for the connection establishment. There is thus little merit in automating the connection establishment timer. Accordingly, upon detecting that the timer type is the connection establishment timer based on the timer register transmitted from the timer 303, the data transmission unit 302 notifies the interrupt controller 304 that an interrupt request has been made to the processor 301.

Meanwhile, when the src side receives a TCP packet with both the SYN flag and an ACK flag (SYN+ACK) set from the dst side before the connection establishment timer has expired, the TCP state is moved to a state called "SYN_SENT". An ACK packet sent by the src side in response to the SYN+ACK indicates that the connection has been established on the src side. The dst side discovers that the connection has been established upon receiving the ACK packet from the src side. While it does not matter from which side packets are transmitted once the connection has been established, FIG. 9 illustrates the case where packets are transmitted by the src side.

With TCP/IP, communication is performed while constantly checking the data transmission, and therefore the processor 301 starts the retransmission timer at the same time as packet transmission. The processor 301 registers the timer value along with the connection identifier and timer type (retransmission timer) in the timer register for the timer 303 in order to start the retransmission timer, and sets the valid flag in the timer register. When an ACK packet is returned by the dst side in response to the transmitted packet, the reception is considered to have been successfully confirmed, and the retransmission timer is stopped. In other words, the flag in the timer register of the retransmission timer is invalidated. This can be implemented by using the "abandon" operation information described above. The retransmission timer is once again started when the packet transmission resumes. The timer value at this time is re-set by the processor 301. Although there are cases where the value of the retransmission timer fluctuates dynamically based on the communication status and the like in actual TCP/IP communication, that movement shall not be discussed in the present embodiment. In this manner, the retransmission timer is started with each packet transmission, and is stopped each time an ACK packet is received.

If the src side does not receive an ACK packet, the retransmission timer expires. The timer 303 notifies the data transmission unit 302 of the connection identifier and timer type (retransmission timer, in this case) of the expired retransmission timer. In this case, an ACK has not been received for the transmission data that has already been transmitted, and thus the data transmission unit 302 holds the transmission data as-is. Therefore, the data transmission unit 302 commences packet retransmission from the ACK point by re-using the descriptor used for the data transmission (Step S226).

Meanwhile, on the dst side, a delay ACK timer is started in the TCP/IP communication device each time a packet is received. The delay ACK timer is a timer for inhibiting the transmission of an ACK packet in order to transmit an ACK packet for a group of received packets; the delay ACK timer is used because the communication traffic increases when an ACK packet is transmitted for every received packet. An ACK packet, which is a communication confirmation packet, is transmitted from the dst side to the src side when the delay ACK timer expires. Because the ACK packet is a packet for notifying the partner of the communication status at the present time, it often does not have a payload, with the exception of cases in which the data transmission request is separate. Accordingly, an ACK packet is created in advance in the main memory unit 305, and the data transmission unit 302 combines the connection identifier information (IP address, port number, sequence number, and so on) and generates an ACK packet in Step S226. Then, the data transmission unit 302 transmits the generated ACK packet to the MAC/PHY 306. Doing so automatically transmits the ACK packet when the delay ACK timer expires, without going through the processor 301. Thus, in the case where the timer type included in the network timer information indicates an ACK timer for TCP/IP communication, the data transmission unit 302, serving as the stated second transmission unit, sends an ACK packet notifying the partner terminal of the sequence number its own terminal received.

The persist timer shall be described next. There are situations where the sender is notified that the receive window is "0", such as in the case where the communication capabilities of the recipient are lower compared to the communication capabilities of the sender and memory for communication with the recipient has been used up, the case where the data processing of an application cannot keep up with the speed at which the reception buffer is filled, and so on. This is called a "'0' window advertisement" and as it indicates that the reception buffer of the recipient is full, the target of the advertisement stops transmission.

However, because the transmission cannot be stopped indefinitely, a probing packet is transmitted to the dst side during an interval extending to the expiration of a persist timer. In response to the sending of the probing packet, the dst side sends an ACK packet, notifying the sender of the latest value for the receive window. The probing packet is a packet that can be prepared in advance, and because it is a packet that is often generated in the case where the functionality of the recipient is inferior to that of the sender, automation makes it possible to transmit the probing packet without affecting other connections. In other words, in the case where the timer type of the timer that has expired is the persist timer, the data transmission unit 302 automatically transmits the probing packet to the dst side.

Thus far, processing performed with respect to the retransmission timer, delay ACK timer, and persist timer of the protocol processing apparatus of the third embodiment when these timers expire has been described. There are many cases where other TCP timers, TIME_WAIT, FIN_WAIT, FIN_WAIT2 timers, and so on are only started once when a connection is closed, in the same manner as the connection establishment timer. For this reason, a satisfying processing speed can be obtained through processing performed by the processor through the use of interrupts, as long as the system is not a system that frequently opens/closes connections.

As described thus far, according to the third embodiment, network timer information composed of a connection identifier and a timer type is added to the timer used in connection-type communication. For this reason, the data transmission unit that has received a notification that a timer has expired can load a descriptor from the network timer information and execute data transmission. The processing load can therefore be significantly reduced, and through this reduction, the processor resources can be allocated to other protocol processes, leading to an improvement in processing capabilities.

It should be noted that the procedure for processing performed upon timer expiration as indicated in the third embodiment can also be applied to the first embodiment or the second embodiment.

Furthermore, a system in which the data transmission unit sets the timer type and connection identifier in the timer as in the first and second embodiments and carries out processing in accordance with the descriptor stored in the main memory unit 105 as in the third embodiment is also possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-248185, filed Sep. 25, 2007, which is hereby incorporated by reference herein in its entirety.

What is claimed is:

1. A communication apparatus comprising:
a memory unit configured to store data to be transmitted to an other apparatus;
an interface unit configured to transmit the data to the other apparatus via a network;
a processor configured to manage connection information that includes address information of the communication apparatus and address information of the other apparatus;
a transmission unit configured to transmit the data stored in the memory unit to the interface unit in accordance with a transmission request from the processor; and
a timer unit configured to perform a plurality of time measurements by a plurality of timers corresponding to the connection information managed by the processor,
wherein the transmission unit transmits an interrupt signal for releasing the connection information to the processor if a first type of the timers expires, and transmits the data read from the memory unit to the interface unit if a second type of the timers expires.

2. The apparatus according to claim 1, wherein the timer unit performs the time measurements by a connection establishment timer and a transmission timer that correspond to the connection information, and
the transmission unit transmits the interrupt signal for releasing the connection information to the processor if the transmission unit detects that the connection establishment timer has expired before a connection with the other apparatus corresponding to the connection information is established, and transmits data read from the memory unit to the interface unit, to transmit the data to the other apparatus, if the transmission timer expires after the connection with the other apparatus corresponding to the connection information is established.

3. The apparatus according to claim 1, wherein the transmission unit notifies the connection information to the processor if the transmission unit detects that the first type of the timers has expired.

4. The apparatus according to claim 1, wherein the second type of the timers is stopped when the transmission unit detects that the second type of the timers has expired.

5. The apparatus according to claim 1, wherein the transmission request includes location information indicating a location where the data are stored, and
the transmission unit reads the data from the memory based on the location information and transmits the data to the interface unit.

6. A communication method of a communication apparatus that includes a memory unit configured to store data to be transmitted to an other apparatus, an interface unit configured to transmit the data to the other apparatus via a network, and a processor configured to manage connection information that includes address information of the communication apparatus and address information of the other apparatus, the method comprising:
transmitting, by a transmission unit, the data stored in the memory unit to the interface unit in accordance with a transmission request from the processor; and
performing, by a timer unit, a plurality of time measurements by a plurality of timers corresponding to the connection information managed by the processor,
wherein the transmitting includes transmitting an interrupt signal for releasing the connection information to the processor if a first type of the timers expires, and transmitting the data read from the memory unit to the interface unit if a second type of the timers expires.

7. The method according to claim 6, wherein the timer unit performs the time measurements by a connection establishment timer and a transmission timer that correspond to the connection information, and
wherein the transmitting includes transmitting the interrupt signal for releasing the connection information processor if the transmission unit detects that the connection establishment timer has expired before a connection with the other apparatus corresponding to the connection information is established, and transmitting the data read from the memory unit to the interface unit, to transmit the data to the other apparatus, if the transmission unit detects that the transmission timer expires after the connection with the other apparatus corresponding to the connection information is established.

8. The method according to claim 6, further comprising:
notifying, by the transmission unit, the connection information to the processor if the transmission unit detects that the first type of the timers has expired.

9. The method according to claim 6, further comprising:
stopping, by the timer unit, the second type of the timers when the transmission unit detects that the second type of the timers expired.

10. The method according to claim 6, wherein the transmission request includes location information indicating a location where the data are stored, and the method further comprises:
reading, by the transmission unit, the data from the memory based on the location information; and
transmitting, by the transmission unit, the data to the interface unit.

* * * * *